(12) United States Patent
Ihnatisin

(10) Patent No.: US 8,613,356 B1
(45) Date of Patent: Dec. 24, 2013

(54) RIMLESS TIRE COVER

(71) Applicant: George Ihnatisin, Orland Hills, IL (US)

(72) Inventor: George Ihnatisin, Orland Hills, IL (US)

( * ) Notice: Subject to any disclaimer, the term of this patent is extended or adjusted under 35 U.S.C. 154(b) by 0 days.

(21) Appl. No.: 13/668,466

(22) Filed: Nov. 5, 2012

(51) Int. Cl.
*B65D 85/06* (2006.01)

(52) U.S. Cl.
USPC .......................................... 206/304; 224/42.2

(58) Field of Classification Search
USPC ........................ 206/303, 304, 304.2; 224/42.2
See application file for complete search history.

(56) References Cited

U.S. PATENT DOCUMENTS

| | | | | | |
|---|---|---|---|---|---|
| 3,319,687 | A | * | 5/1967 | Tomchak | 134/201 |
| 4,304,279 | A | * | 12/1981 | Thomas | 206/303 |
| 4,550,827 | A | * | 11/1985 | Watts et al. | 206/304 |
| 4,623,010 | A | * | 11/1986 | Takahashi | 152/450 |
| 4,893,713 | A | * | 1/1990 | Thomas | 206/304 |
| 6,044,968 | A | * | 4/2000 | Iampen | 206/304 |

\* cited by examiner

*Primary Examiner* — Jacob K Ackun
(74) *Attorney, Agent, or Firm* — Dillis V. Allen, Esq.

(57) ABSTRACT

A rimless tire cover system for protecting a wheel-less tire including a first annular cover on one side of the tire and a second annular cover on the other side of the tire and a tubular central connector for pulling the first and second covers against the sides of the tire. Each of the covers has an annular seal portion that conforms in shape to and engages and seals directly against the tire bends.

12 Claims, 3 Drawing Sheets

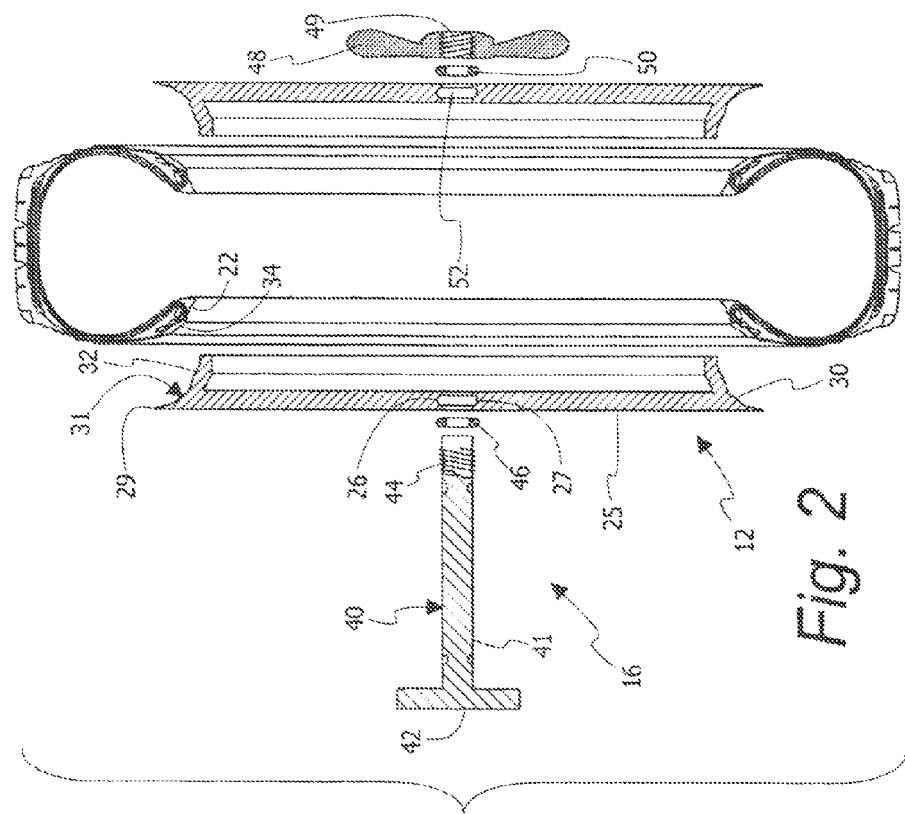
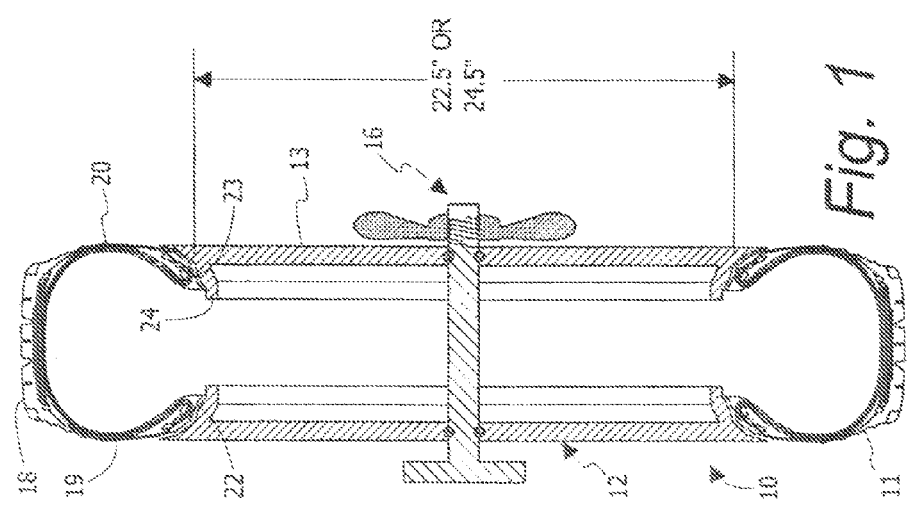
Fig. 1
Fig. 2

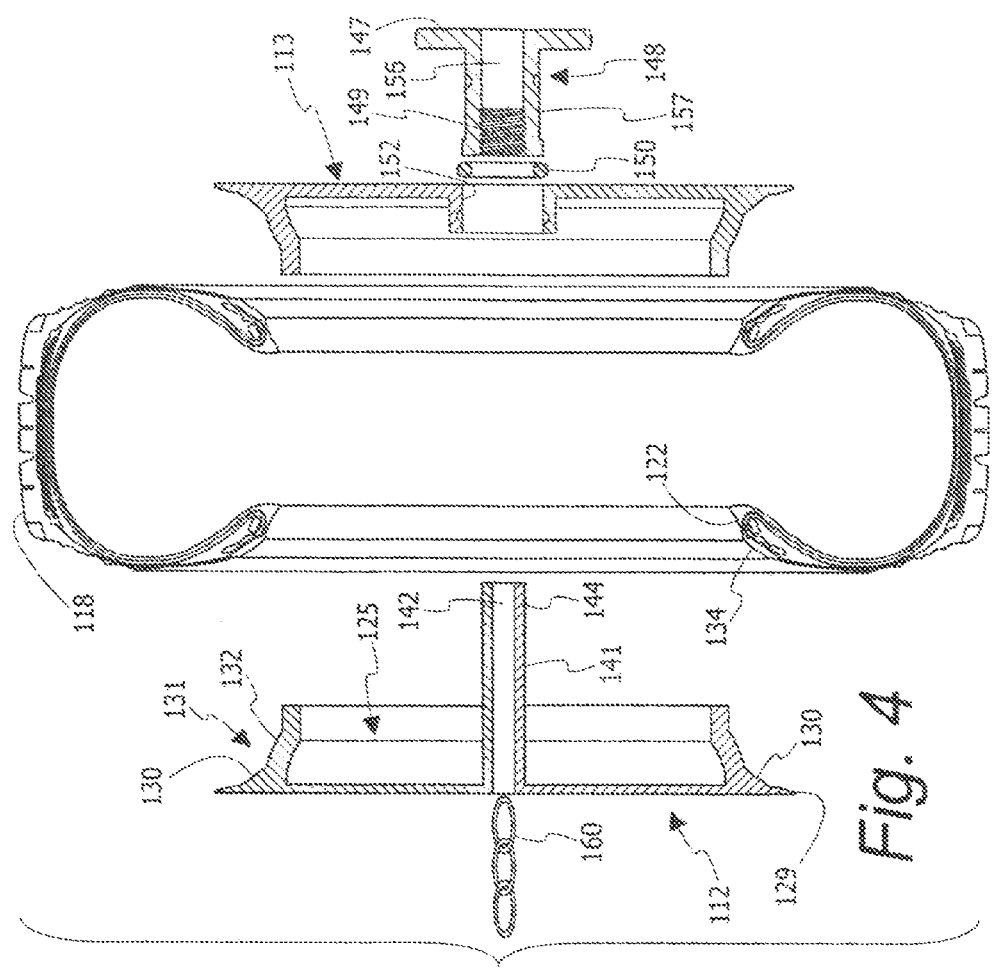
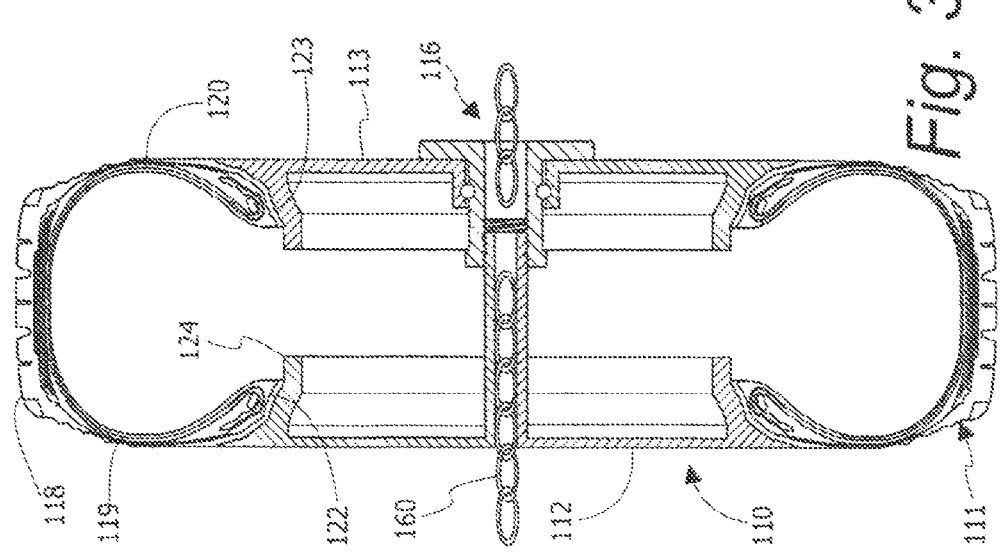
Fig. 3
Fig. 4

RIMLESS TIRE COVER

BACKGROUND OF THE INVENTION

Tire storage, particularly on truck tractors, is a problem because of space constraints so spare tires are usually mounted externally where they are subject to the elements and also to theft. By storing the tire with a wheel, the theft problem is worse because the wheel costs upwards of $300 depending on size and quality. Therefore, it would be desirable to store the spare tire without a wheel to minimize the cost and the theft problem. This creates ancillary problems of debris or icing inside the stored tire, which is difficult to clean when tire changing is required.

Tire covers presently in the market do not solve these problems because they are designed to fit over wheeled tires and most are not durable enough to endure extreme outdoor elements and they do not address the theft problem.

The following patents have been found in a preliminary patentability search:

| Inventor | Pat. No. | Issue Date |
| --- | --- | --- |
| Campbell | Design 305,322 | Jan. 2, 1990 |
| Colgan | 5,076,477 | Dec. 31, 1991 |
| Cochrane, et al. | 5,513,788 | May 7, 1996 |
| Seltz | 5,823,413 | Oct. 20, 1998 |
| Saegusa, et al. | 5,921,449 | Jul. 13, 1999 |
| Rastelli | 6,116,415 | Sep. 12, 2000 |
| Chiku, et al. | 7,175,058 | Feb. 13, 2007 |
| Spater, et al. | 7,478,723 | Jan. 20, 2009 |
| Rock, et al. | 7,770,764 | Aug. 10, 2010 |

UNITED STATES PATENT APPLICATION PUBLICATION

Obriot, Publication No US 2002/0187029, Pub. Dec. 12, 2002

These cover devices are all designed to cover Wheeled tires and they have other disadvantages. The flexible covers are not durable enough. Some of the others are too complex and will not work in all tire locations on the vehicle.

It is a primary object of the present invention to ameliorate the problems noted above in tire covers.

SUMMARY OF THE PRESENT INVENTION

In accordance with the present invention, a rimless tire cover system is provided that includes a first annular cover on one side of the tire and a second annular cover on the other side of the tire and a tubular central connector for pulling the first and second covers against the sides of the tire. Each of the covers has an annular seal portion that conforms in shape to and engages and seals directly against the tire bends.

This system permits the tire to be stored at a lower cost without a wheel, while eliminating the old problem of debris and ice inside the wails tire found in the past. The cover presents a low profile, inside the tire envelope, so it is very easy to store anywhere in the truck—even underside. It also reduces theft by its tether passage through the center that permits the threading of a tie-down chain or other tie-down therethrough.

Other advantages are reduced tooling costs and overall reduced costs for the entire cover system.

Other objects and advantages will appear more clearly from the following detailed description.

BRIEF DESCRIPTION OF THE DRAWINGS

FIG. 1 is a cross-section of a rimless tire cover system according to one embodiment of the present invention, mounted on a truck tire;

FIG. 2 is a cross-section of the rimless tire cover system shown in FIG. 1, in exploded positions;

FIG. 3 is a cross-section of a rimless tire cover system according to a second embodiment of the present invention, mounted on a truck tire;

FIG. 4 is a cross-section of a rimless tire cover system shown in FIG. 3 in exploded positions, and;

DETAILED DESCRIPTION OF THE PREFERRED EMBODIMENTS

Figure 5:
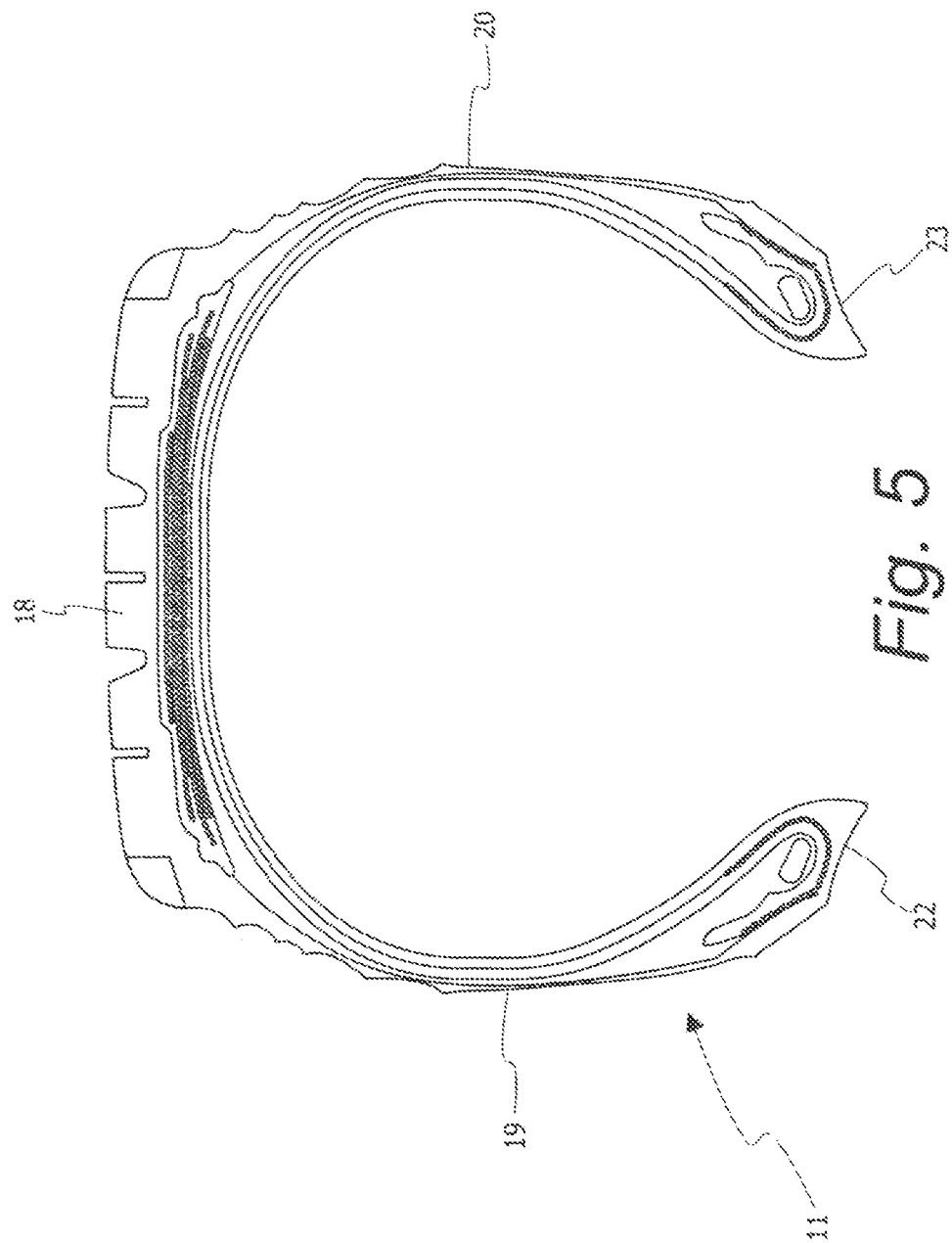
FIG. 5 is an enlarged cross-section of the tire shown in FIGS. 1 to 4.

Referring to the drawings and initially FIGS. 1 and 2, a rimless tire cover system is illustrated covering a tire 11 in FIG. 1, and is seen to include a one-piece circular cover 12 on one side of tire 11, and a one-piece circular cover 13 covering the other side of the tire 11, held and pulled together by a connector assembly 16.

The tire 11, which is a truck type tire, includes a thread portion 18, side walls 19 and 20, and annular beads 22 and 23, which as can be seen in FIG. 5, are annular and concave in cross-section.

Returning to FIGS. 1 and 2, the cover 12 is seen to include a circular disc portion 25 having an annular outer edge 29 with an inwardly directed integral annular flange 31 having a first tire side wall engaging slightly concave annular surface 30, and a connected tire bead engaging surface 32 that is annular with a convex cross-section to seal off against the concave tire bead surface 22. Integral annular wall 24 guides the covers 12 and 13 into the tire in proper axial alignment with the tire.

Cover 13 is a mirror image of cover 12 and includes a central opening 52, the duplicate of opening 26 in cover 12.

The connector assembly 16 includes a rod 40 with a shaft portion. 41 and a head portion 42 threaded at end 46 and sealed in opening 26 with O ring 46 which seats in annular recess 27 when assembled as in FIG. 1.

Rod 40 is threaded to and pulled by wing nut 48, threaded at 49, and sealed to and against the outside of cover 13 by O ring 50 seated in opening 52, when assembled in the FIG. 1 position.

A second embodiment of the present rimless tire cover system is shown in FIGS. 3 and 4 and is seen to include the rimless tire cover system 110, which consists of cover 112 and cover 113 connected and pulled together against the tire side walls by a modified connector assembly 116.

The cover 112 is also circular and has an outer annular edge 129 from which depends inwardly an integral annular flange 131 including annular tire side wall engaging with a cross-sectional slightly concave surface 130 and depending tire bead engaging annular surface 132 that is convex in cross-section to tightly seal against tire bead surface 122. Integral annular wall 124 guides the covers 112 and 113 into the tire in proper axial alignment with the tire.

Cover 112 has an integral central tube 141 that has a central bore 142 for theft prevention tie-down chain 160, which is threaded at 144 to attach to annular connector 148 forming part of connector assembly 116.

The other cover 113 is a mirror image of cover 112 except for short central integral tube portion 152, through which connector 148 extends when assembled.

The connector assembly 116 includes tube portion 141, annular connector 148 and tube portion 152.

Annular connector 148 includes an annular portion 157, internally threaded at 149 with an enlarged integral head portion 147, with a thru bore 156 therethrough.

O ring 150 seals connector 148 with bore 152 in cover 113.

Annular connector 147 is manually rotated to thread on tube portion 141, pulling covers 112 and 113 together and in seating engagement with tire 111, as shown in the FIG. 3 assembled position.

The invention claimed is:

1. A rimless tire cover and tire assembly to protect the tire without a wheel from debris or other effects, comprising: a tire without a wheel, the tire having an annular radially inward bead with a curved wheel sealing annular surface where the wheel rim would normally seat, a first cover member for one side of the tire, a second cover member for the other side of the tire, each first and second cover members having a seal portion with the same shape as the bead curved wheel sealing surface for engaging the tire bead curved wheel sealing surface to protect the tire interior, and a connector for holding the first and second tire cover members together, said cover members and connector extending completely across the tire and impervious to debris entry into the tire interior.

2. A rimless tire cover and tire assembly to protect the tire without a wheel from debris or other effects as defined in claim 1, wherein the seal portions are annular.

3. A rimless tire cover and tire assembly to protect the tire without a wheel from debris or other effects as defined in claim 1, wherein the seal portion directly engages the tire beads.

4. A rimless tire cover and tire assembly to protect the tire without a wheel from debris or other effects as defined in claim 1, wherein the seal portions are annular and have an arcuate cross-section to complement the shape of the tire beads.

5. A rimless tire cover and tire assembly to protect the tire without a wheel from debris or other effects as defined in claim 1, wherein the first and second cover members are circular.

6. A rimless tire cover and tire assembly to protect the tire without a wheel from debris or other effects as defined in claim 1, wherein the connector is a hollow rod to permit a tire tie-down to pass therethrough.

7. A rimless tire cover and tire assembly to protect the tire without a wheel from debris or other effects as defined in claim 1, wherein the connector includes a first tube connected to one of the cover members, and a second tube rotatedly mounted in the other cover member threadedly engageable with the first tube to hold the cover member together.

8. A rimless tire cover and tire assembly to protect the tire without a wheel from debris or other effects as defined in claim 1, wherein the first and second cover members are positioned on the tire inside the cross sectional width of the tire to conserve space and cost.

9. A rimless tire cover and tire assembly to protect the tire without a wheel from debris or other effects, comprising: a tire without a wheel, the tire having an annular radially inward bead with a curved wheel sealing annular surface where the wheel rim would normally seat, a first cover member for one side of the tire, a second cover member for the other side of the tire, each first and second cover members having a seal portion with the same shape as the bead curved wheel sealing surface for engaging the tire directly on the tire bead curved wheel sealing surface for sealing the interior of the tire, and a rod-like connector extending between the first and second cover members for holding the cover members together against the sides of the tire, said cover members and connector extending completely across the tire and impervious to debris entry into the tire interior.

10. A rimless tire cover and tire assembly to protect the tire without a wheel from debris or other effects as defined in claim 9, wherein the seal portions are annular and have arcuate cross-sections to complement the shape of the tire beads.

11. A rimless tire cover and tire assembly to protect the tire without a wheel from debris or other effects as defined in claim 9, wherein the first an second members are circular and the connector is a hollow rod to permit a tire tie-down to pass therethrough.

12. A rimless tire cover and tire assembly to protect the tire without a wheel from debris or other effects, comprising: a tire without a wheel, the tire having an annular radially inward bead with a curved wheel sealing annular surface where the wheel rim would normally seat, a first cover member for one side of the tire, a second cover member for the other side of the tire, each first and second cover members having a seal portion with the same shape as the bead curved wheel sealing surface for engaging the tire directly on the tire bead curved wheel sealing surface for sealing the interior of the tire, and a rod-like connector extending between the first and second cover members for holding the cover members together against the sides of the tire, wherein the connector includes a first tube connected to one of the cover members, and a second tube rotatedly mounted in the other cover member threadedly engageable with the first tube to hold the cover member together and the first and second cover members are positioned on the tire inside the cross sectional width of the tire to conserve space and cost, said cover members and connector extending completely across the tire and impervious to debris entry into the tire interior.

* * * * *